Figure 1:
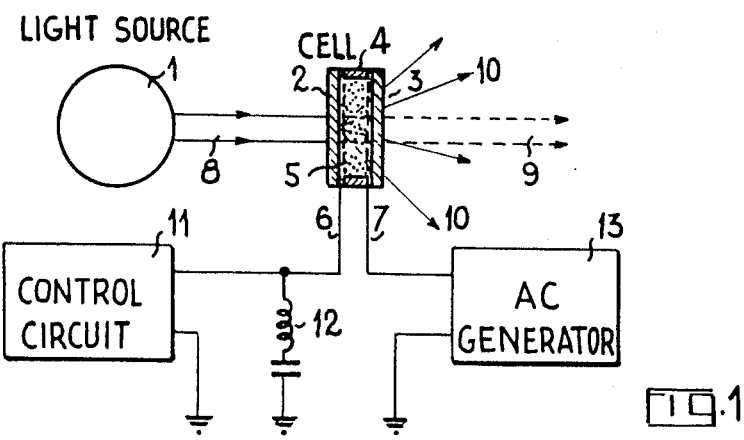

OR  3,718,381

United State
Assouline et al.

[11] 3,718,381
[45] Feb. 27, 1973

[54] LIQUID CRYSTAL ELECTRO-OPTICAL MODULATORS

[75] Inventors: Georges J. Assouline; Michel Hareng; Eugene Leiba, all of Paris, France

[73] Assignee: Thomson-CSF, France

[22] Filed: March 12, 1971

[21] Appl. No.: 123,583

[30] Foreign Application Priority Data

March 17, 1970 France..................................7009518

[52] U.S. Cl.............................................350/160 LC
[51] Int. Cl.................................................G02f 1/28
[58] Field of Search....................................350/160

[56] References Cited

UNITED STATES PATENTS

| 3,575,493 | 4/1971 | Heilmeier | 350/160 |
| 3,575,492 | 4/1971 | Nester | 350/160 |

OTHER PUBLICATIONS

G. H. Heilmeier, "Liquid Crystal Display Devices", Sci. Amer. 4/70 pp. 100–106.

R. A. Soref, "Solid Facts About Liquid Crystals", Laser Focus, 9/70 pp. 45–49.

"Liquid Crystal Work Cuts Time to Large-Scale Electronic Uses" C & En, Sept. 30, 1968, pp. 32–33.

*Primary Examiner*—Ronald L. Wibert
*Assistant Examiner*—J. Rothenberg
*Attorney*—Cushman, Darby & Cushman

[57] ABSTRACT

The present invention relates to electro-optical modulators wherein dynamic scattering of a layer of liquid crystal is controlled for transmitting a variable amount of radiant energy.

The liquid crystal modulator according to the invention comprises a cell associated with an a.c. generator. Under the action of this generator the delay time of the cell is reduced without introducing any misalignment of the liquid crystal molecules in the absence of an electrical control signal.

8 Claims, 4 Drawing Figures

LIQUID CRYSTAL ELECTRO-OPTICAL MODULATORS

The present invention relates to electro-optical devices comprising a liquid crystal cell the molecules of which are capable of optically modulating a beam of radiant energy when an electrical voltage is applied to the cell in order to disturb the alignment of said molecules. These devices are employed in particular as optical diffusers and as read-out elements for the optical display of an electrical quantity.

According to the dynamic scattering principle, the quantity of light transmitted or reflected along the normal optical trajectory by a liquid crystal cell is substantially reduced when a direct or alternating voltage is applied to said cell, with an applitude exceeding a certain voltage threshold. When said voltage is removed, it will be observed that the cell recovers its transparent or specular reflection condition relatively slowly. This slow relaxation phenomenon is an undesired one since it prevents the optical transmissivity of a liquid crystal cell from being rapidly modulated.

In order to remove this drawback, it has been proposed that the liquid crystal be subjected permanently to the action of a steady electric or magnetic field in order that the molecules of the liquid crystal can realign themselves more rapidly as soon as the control voltage drops below the misalignment threshold.

These solutions, however, are relatively complex to put into effect since it is necessary to equip the liquid crystal cell with supplementary electrodes or to surround it by a powerful magnet.

According to the present invention, there is provided liquid crystal electro-optical modulator for modulating a beam of radiant energy in response to a control signal, said modulator comprising : a cell having two electrodes capable of transmitting said radiant energy, a layer of liquid crystal positioned between said electrodes, an A.C. generator for feeding to said electrodes an A.C. voltage having an amplitude higher than the D.C. voltage threshold capable of causing said dynamic scattering under the action of said control signal; the frequency of said A.C. voltage being higher than the threshold frequency at which said amplitude is capable of producing said dynamic scattering in the absence of said control signal.

Figure 2:
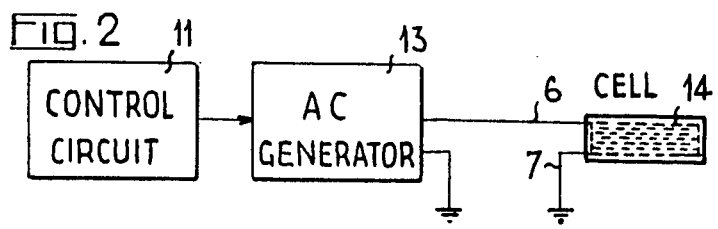
Figure 3:
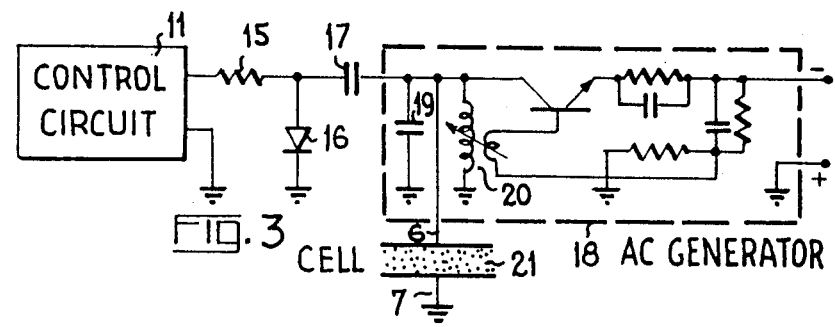
Figure 4:
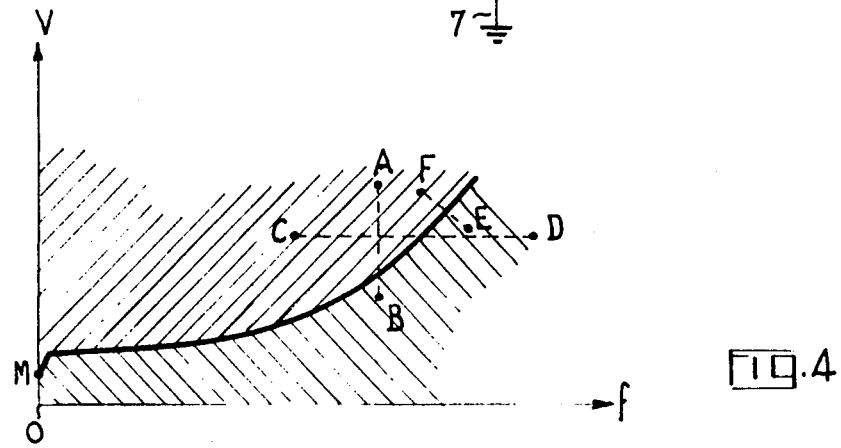

For a better understanding of the invention and to show how the same may be carried into effect reference will be made to the following description and drawings among which :

FIG. 1 schematically illustrates a first embodiment of a dynamic scattering electro-optical modulator in accordance with the invention ;

FIG. 2 illustrates a first embodiment of the device of FIG. 1;

FIG. 3 schematically illustrates a second embodiment of the device of FIG. 1 ;

FIG. 4 is an explanatory diagram.

In FIG. 1, there can be seen the diagram of a dynamic scattering electro-optical modulator in accordance with the invention. A light source 1 illuminates a diffuser cell constituted by two transparent plates 2 and 3 attached to a support 4. The internal faces of the plates 2 and 3 are thinly metallized in order to exhibit good transparency while being conductive at the same time; they form the electrodes 6 and 7 which are in contact with the liquid crystal 5 filling the interior of the cell. The crystal 5 is in the nematic phase. The electrode 6 is connected to an electrical source 11 designed to provide the control signal for the modulator ; the electrode 7 is connected to an a.c. voltage generator 13 ; a by-pass element 12 can be provided in order to decouple the input terminals of the modulator from the generator 13.

In the absence of any voltage across terminals 6 and 7, the molecules of the liquid crystal 5 can align themselves in relation to the internal faces of the plates 2 and 3 in such a way as not to diffuse the light which they receive from the source 1. If a direct or alternating voltage is applied between said electrodes 6 and 7, then it will be observed that beyond a certain voltage threshold, the molecular alignment undergoes a substantial disturbance which has the effect of scattering the light received by the cell.

Experience shows that the voltage threshold beyond which electrical excitation can give rise to the phenomenon of dynamic scattering varies depending upon the nature of the voltage applied. The lowest threshold corresponds to the application of a direct voltage. If the voltage is an alternating one, the threshold rises and indeed to a progressively greater extent the higher the frequency of said voltage. The law of variation of the threshold voltage V as a function of the frequency f is sketched by the curve shown in FIG. 4. This curve splits the quadrant VOf into two zones.

The region in which the cell scatters the radiant energy, corresponds to the upper zone since each point in this zone defines a voltage amplitude which exceeds the threshold fixed by the curve ; the zone located between the curve and the axis Of, corresponds to the transparent state of the cell.

In accordance with the invention, the generator 13 applies to the liquid crystal cell an alternating voltage the amplitude of which is higher than the direct voltage threshold OM of FIG. 4 ; however, the frequency of the generator 13 is adjusted so that no misalignment of the liquid crystal molecules takes place. When the electrical source 11 produces a control signal, dynamic scattering takes place but as soon as said signal disappears, rapid realignment is brought about under the action of the alternating voltage produced by the generator 13.

In the absence of the generator 13, the molecular realignment would take much too long a time. By way of example, a liquid crystal cell in the nematic phase, capable of spontaneous realignment in 250 ms, has this time reduced to 10 ms when it is associated with a generator 13 producing an alternating r.m.s. voltage of 140 V at 5 kc/s.

In the circuit of FIG. 1, the control signal is simply superimposed upon the alternating voltage produced by the generator 13 ; it is possible to provide at the terminals of the source 11 a rejection filter 12 tuned to the frequency of the alternating voltage in order to prevent any parasitic a.c. from flowing through the control circuit. It goes without saying that the generator 13 can supply several liquid crystal cells.

In the foregoing, the amplitude and frequency of the alternating voltage produced by the generator 13 have been selected in order that the point having the corresponding coordinates is plotted below the curve of FIG. 4 defining the molecular misalignment threshold.

In FIG. 2, the diagram of a variant embodiment of the electrotoptical modulator in accordance with the invention can be seen. The control signal source 11 is connected to an amplitude modulated generator 13 which produces an alternating voltage of fixed frequency at the terminals 6 and 7 of the liquid crystal cell 14. When the source 11 is not producing any signal the generator 13 is adjusted so that the point marked B whose coordinates correspond with the frequency and amplitude of the supplied alternating voltage, is located beneath the threshold curve of FIG. 4. The control signal acts upon the generator 13 to cause the a. c. amplitude to increase so that the working point is located at A in FIG. 4 ; thus, molecular misalignment is brought about and produces dynamic scattering of the light. As soon as the control signal disappears, the a.c. amplitude reverts to its original value and molecular realignment takes place rapidly.

In FIG. 3, a second variant embodiment of the electrooptical modulator in accordance with the invention can be seen. The liquid crystal cell 21 has its electrodes 6 and 7 connected to the output terminals of the conventional oscillator 18. The tank circuit of the oscillator 18 comprises an inductor 20 and a capacitor 19 chosen in such a way that the alternating voltage applied to the cell 21 has a frequency of such value as not to bring about molecular misalignment of the liquid crystal ; the amplitude of the alternating voltage produced by the oscillator 18 is constant, enabling rapid realignment of the molecules of the liquid crystal. The control signal source 11 is connected through the medium of the resistor 15 to a diode 16 ; in the absence of any signal, the diode 16 is blocked and becomes conductive as soon as the control voltage is supplied by the source 11. The capacitor 17 is placed in parallel with the capacitor 19 when the diode 16 is conductive, which has the effect of reducing the frequency of oscillation to below the threshold frequency at which the amplitude of the alternating voltage enables a transition from one to the other of the cross-hatched zones of FIG. 4, to be made.

In the absence of a control signal, the oscillator 18 supplies the cell 21 with an alternating voltage whose amplitude and frequency are determined by the coordinates of the point D in FIG. 4. When a control signal is present, the oscillator 18 retains the same amplitude of oscillation but the frequency of oscillation falls ; in FIG. 4, the point defining the new alternating voltage, is located at C, that is to say in the zone in which the liquid crystal diffuses the light.

Without departing from the scope of the present invention, it is possible to provide a generator which supplies to the cell an alternating voltage which, in the absence of any control signal, has amplitude-frequency coordinates corresponding to the point E in FIG. 4 and, in the presence of said signal, coordinates corresponding to point F located at the other side of the threshold curve. In this case, the alternating voltage generator is simultaneously modulated both in amplitude and frequency. As far as the electrical control of a liquid crystal, coupled with a reduction in the response time, is concerned, the invention is not limited to the case where the electro-optical effect is an effect of dynamic scattering such as is produced when the liquid crystal is in the nematic phase. If the liquid crystal is in fact in the smectic or cholecteric phase, the a.c. generator likewise brings about a reduction in the relaxation time.

What we claim is:

1. Liquid crystal electro-optical modulator for modulating a beam of radiant energy in response to a control signal, said modulator comprising : a cell having two electrodes, and positioned for transmitting said radiant energy, a layer of liquid crystal positioned between said electrodes, an A.C. generator continuously feeding to said electrodes an A.C. voltage having an amplitude higher than the D.C. voltage threshold capable of causing the dynamic scattering of said layer, and electrical means for causing said dynamic scattering under the action of said control signal; said electrical means having terminals for receiving said control signal; the frequency of said A.C. voltage being higher than the threshold frequency at which said amplitude is capable of producing said dynamic scattering in the absence of said control signal.

2. Electro-optical modulator as claimed in claim 1, wherein said liquid crystal is in the nematic phase.

3. Electro-optical modulator as claimed in claim 1, wherein said electrical means are means for superimposing said control signal upon said A.C. voltage ; said A.C. voltage having constant amplitude and frequency.

4. Electro-optical modulator as claimed in claim 3, wherein said electrical means comprise decoupling means connected across said terminals.

5. Electro-optical modulator as claimed in claim 1, wherein said A.C. generator is a modulated A.C. generator having a modulating input; said electrical means transmitting said control signal to said modulating input.

6. Electro-optical modulator as claimed in claim 5, wherein said A.C. voltage is amplitude modulated by said control signal for selectively causing said dynamic scattering; said modulated A.C. generator being an amplitude modulated generator.

7. Electro-optical modulator as claimed in claim 5, wherein said A.C. voltage is frequency modulated by said control signal for selectively causing said dynamic scattering; said modulated A.C. generator being a frequency modulated generator.

8. Electro-optical modulator as claimed in claim 5, wherein said A.C. voltage is both frequency and amplitude modulated by said control signal for selectively causing said dynamic scattering ; said modulated A.C. generator being an amplitude and frequency modulated generator.

* * * * *